(12) United States Patent
Raynor

(10) Patent No.: US 12,474,203 B2
(45) Date of Patent: Nov. 18, 2025

(54) AMBIENT LIGHT SENSOR HAVING COMMON CENTROID LAYOUT

(71) Applicant: STMicroelectronics (Research & Development) Limited, Marlow (GB)

(72) Inventor: Jeffrey M. Raynor, Edinburgh (GB)

(73) Assignee: STMICROELECTRONICS (RESEARCH & DEVELOPMENT) LIMITED, Marlow (GB)

( * ) Notice: Subject to any disclaimer, the term of this patent is extended or adjusted under 35 U.S.C. 154(b) by 0 days.

(21) Appl. No.: 18/492,903

(22) Filed: Oct. 24, 2023

(65) Prior Publication Data
US 2024/0151579 A1 May 9, 2024

(30) Foreign Application Priority Data
Nov. 4, 2022 (EP) .................................. 22205666

(51) Int. Cl.
*G01J 1/42* (2006.01)
*G01J 1/44* (2006.01)

(52) U.S. Cl.
CPC ........... *G01J 1/4204* (2013.01); *G01J 1/4228* (2013.01); *G01J 1/44* (2013.01); *G01J 2001/446* (2013.01); *G01J 2001/448* (2013.01)

(58) Field of Classification Search
CPC ...... G01J 1/4204; G01J 1/44; G01J 2001/446; H04N 23/00
See application file for complete search history.

(56) References Cited

U.S. PATENT DOCUMENTS

| | | |
|---|---|---|
| 11,587,527 B2 | 2/2023 | Raynor |
| 2009/0015785 A1 | 1/2009 | Blum et al. |
| 2010/0096556 A1* | 4/2010 | Arsalan ............ H01L 27/14659 |
| | | 257/E27.122 |
| 2016/0232828 A1 | 8/2016 | Jia et al. |
| 2017/0221947 A1 | 8/2017 | Shishido et al. |
| 2017/0373105 A1 | 12/2017 | Galor Gluskin |
| 2019/0080668 A1 | 3/2019 | Holenarsipur et al. |
| 2019/0285467 A1 | 9/2019 | Chen et al. |
| 2020/0166403 A1 | 5/2020 | Huang et al. |
| 2021/0193709 A1* | 6/2021 | Lin ................... H01L 27/14607 |
| 2021/0250503 A1* | 8/2021 | Yang ..................... H04N 25/11 |
| 2021/0296377 A1* | 9/2021 | Lu ....................... H01L 27/1462 |
| 2022/0155144 A1 | 5/2022 | Malinge et al. |
| 2022/0279079 A1* | 9/2022 | Sakaguchi ......... H04N 1/32368 |
| 2022/0341779 A1 | 10/2022 | Raynor et al. |
| 2023/0140368 A1 | 5/2023 | Raynor |
| 2024/0110826 A1* | 4/2024 | Michal ................ H03F 3/45475 |

FOREIGN PATENT DOCUMENTS

| | | | |
|---|---|---|---|
| WO | 2008044749 A1 | 4/2008 | |
| WO | WO-2016089551 A1 * | 6/2016 | ........... H01L 27/146 |

\* cited by examiner

*Primary Examiner* — Georgia Y Epps
*Assistant Examiner* — Erin R Garber
(74) *Attorney, Agent, or Firm* — Slater Matsil, LLP

(57) ABSTRACT

A common centroid ambient light sensor includes a matrix of photodiodes having exactly a first row and a second row, at least three color channels, a readout circuit of the first color channel connected to exactly one photodiode in the first row and exactly one photodiode in the second row, and a readout circuit of the second color channel connected to exactly one photodiode in the first row and exactly one photodiode in the second row.

20 Claims, 3 Drawing Sheets

AMBIENT LIGHT SENSOR HAVING COMMON CENTROID LAYOUT

CROSS-REFERENCE TO RELATED APPLICATIONS

This application claims the priority benefit of European patent application number 22205666.5, filed on Nov. 4, 2022, which is hereby incorporated by reference to the maximum extent allowable bylaw.

TECHNICAL FIELD

The present disclosure relates generally to integrated circuits and, in specific embodiments, to ambient light sensor.

BACKGROUND

Ambient light sensors having at least three color channels are known. In such ambient light sensors, each color channel comprises at least one photodiode configured to receive and detect light having wavelengths in a range corresponding to this color channel. In each color channel, each photodiode of the channel is for example associated with, or covered with, a filter configured to transmit light having wavelengths in the range corresponding to this color channel and reject light having wavelengths outside of the range corresponding to this color channel.

Among the above-described ambient light sensors, common centroid ambient light sensors are known. In these sensors, each color channel comprises at least two photodiodes. The photodiodes of the different color channel are arranged to make the sensor less sensitive, or even insensitive, to spatial variations in the light received by the sensor.

However, known common centroid ambient light sensor have drawbacks, such as being cumbersome and/or having connections between the photodiodes and the readout circuits of the color channels, which add parasitic capacitances and thus may degrade noise performance of the sensor.

SUMMARY

Embodiments provide a common centroid ambient light sensor that solves at least some of the drawbacks of the known common centroid ambient light sensors.

For example, embodiments provide a common centroid ambient light sensor that is less cumbersome than known common centroid ambient light sensors.

For example, embodiments provide a common centroid ambient light sensor that has less parasitic capacitances due to connections than known common centroid ambient light sensors.

One embodiment provides a common centroid ambient light sensor that comprises a matrix of photodiodes having exactly a first row and a second row, at least three color channels comprising a first color channel and a second color channel, a readout circuit of the first color channel connected to exactly one photodiode in the first row and exactly one photodiode in the second row, and a readout circuit of the second color channel connected to exactly one photodiode in the first row and exactly one photodiode in the second row.

According to one embodiment, each of the color channels comprises exactly one readout circuit.

According to one embodiment, at least two readout circuits share a common circuit such as an analog-to-digital converter.

According to one embodiment, each of the readout circuits comprises an integrator circuit.

According to one embodiment, each of the readout circuits is configured to implement a correlated double sampling.

According to one embodiment, none of the readout circuits is disposed between the first and second rows.

According to one embodiment, all the readout circuits are disposed along the second row, and each of the readout circuits is aligned, in a direction perpendicular to the first and second rows, with a photodiode of the second row to which the readout circuit is connected, all the readout circuits being preferably aligned with each other in a direction parallel to the first and second rows.

According to one embodiment, the readout circuits are divided into two groups of readout circuits. The readout circuits of a first of the two groups are disposed along the second row. Each of the readout circuits of the first group is aligned, in a direction perpendicular to the first and second rows, with a photodiode of the second row to which the readout circuit is connected. The readout circuits of the first group are preferably aligned with each other in a direction parallel to the first and second rows. The readout circuits of a second of the two groups are disposed along the first row. Each of the readout circuits of the second group is aligned, in a direction perpendicular to the first and second rows, with a photodiode of the first row to which the readout circuit is connected. The readout circuits of the second group are preferably aligned with each other in a direction parallel to the first and second rows.

According to one embodiment, the at least three color channels comprise a third color channel, each color channel except the third color channel comprising exactly one photodiode in the first row and exactly one photodiode in the second row.

According to one embodiment, the readout circuit of the third color channel is connected to exactly two photodiodes in the first row and exactly two photodiodes in the second row, for example respectively arranged at each extremity of the first row and at each extremity of the second row.

According to one embodiment, the readout circuit of the third color channel is connected to exactly three photodiodes in the first row and exactly three photodiodes in the second row, for example respectively arranged at each extremity and at the middle of the first row and at each extremity and at the middle of the second row.

According to one embodiment, the at least three color channels comprise a third color channel, each color channel comprises exactly one photodiode in the first row and exactly one photodiode in the second row, and the readout circuit of the third color channel is connected to the exactly one photodiode in the first row and the exactly one photodiode in the second row, for example respectively arranged in the middle of the first row and in the middle of the second row.

According to one embodiment, in each of the first and second color channels, the readout circuit is connected to the exactly one photodiode in the first row and the exactly one photodiode in the second row with a daisy chain type connection.

According to one embodiment, a guard ring surrounds a set of the first and second rows.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF EMBODIMENTS

Like features have been designated by like references in the various figures. In particular, the structural and/or functional features that are common among the various embodiments may have the same references and may dispose identical structural, dimensional, and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures.

Unless specified otherwise, the expressions "around," "approximately," "substantially" and "in the order of" signify within 10%, and preferably within 5%.

Figure 1:
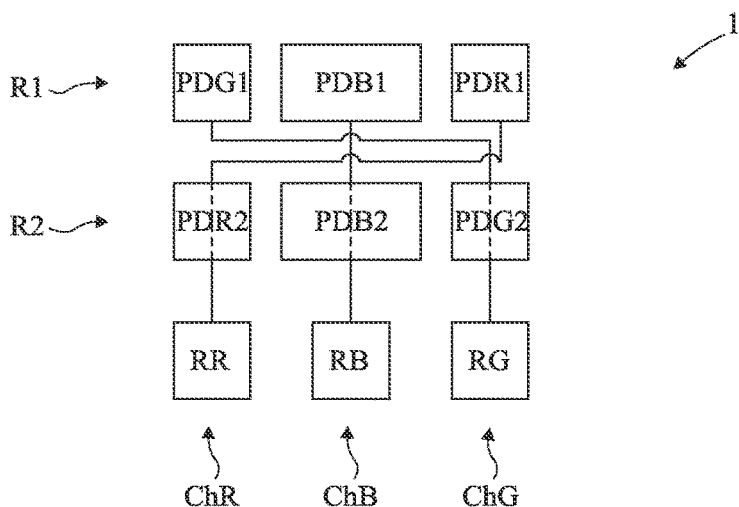
FIG. 1 illustrates, with a schematic top view, an embodiment of a common centroid ambient light sensor.

FIG. 1 illustrates, with a schematic top view, an embodiment of a common centroid ambient light sensor 1.

The ambient light sensor 1 comprises exactly two rows (or lines) of photodiodes and, more particularly, a first row R1 and a second row R2. Each row R1, R2 comprises a plurality of photodiodes. Preferably, the number of photodiodes is the same in each row R1, R2, i.e., the rows have the same length. Preferably, each photodiode of the first row R1 is aligned with a photodiode of the second row in a direction perpendicular to the rows R1, R2. In other words, each photodiode of the first row R1 is vertically aligned with a photodiode of the second row R2 in the FIG. 1. For example, the sensor 1 is arranged into and onto a semiconductor substrate, for example, a silicon substrate, the photodiodes being arranged in the substrate.

Although not shown in FIG. 1, preferably, the sensor 1 comprises a guard ring surrounding the two rows R1 and R2 taken as a whole. The guard ring is configured to insulate the photodiodes of the rows R1 and R2 from the rest of the sensor 1, such that the other circuits of the sensor 1 does not have any parasitic affect on the photodiodes. For example, the guard ring prevents charges (electrons or holes) from other parts of the sensor 1 reaching the photodiodes and corrupting the measured signals. Indeed, the sensor 1 is unable to distinguish between photo-generated charges and charges generated by other part(s) of the sensor 1 that can diffuse through the substrate into the photodiodes. As an example, the guard ring is implemented by a construction similar to the photodiode, for example by a doped region such as a doped well. If the process technology supports a deeper well implant, this is used for better isolation.

Preferably, the implant or doped region of the guard ring is surrounded on both sides (i.e. the side closer to the photodiodes as well as the side closer to the electronic circuits of the sensor other than the photodiodes) by doped regions, for example well implant, of the opposite type of conductivity. For example, when the photodiode is implemented using a N-doped well, the guard ring is implemented using a N-doped well (or region) surrounded by a P-doped well (or region) disposed between the N-doped well (or region) of the guard ring and the N-doped well (or region) of the photodiodes, and by a further P-doped well (or region) disposed between the N-doped well (or region) of the guard ring and the other part(s) of the sensor 1, that is the part(s) of the sensor 1 comprising electronic circuits of the sensor other than the photodiodes.

The sensor 1 comprises N color channels, N being an integer superior or equal to three. In the embodiment of FIG. 1, N is equal to three or, said otherwise, the sensor 1 comprises three color channels ChR, ChB, and ChG. The channels are labeled here as red (R), blue (B), and green (G) although other colors, for example, cyan, magenta, and yellow.

For example, the channel ChR is configured to measure the quantity of red light received by the sensor 1, the red light having for example wavelengths in the range from 570 nm to 680 nm. For example, the channel ChB is configured to measure the quantity of blue light received by the sensor 1, the blue light having for example wavelengths in the range from 380 nm to 500 nm. For example, the channel ChG is configured to measure the quantity of green light received by the sensor 1, the green light having for example wavelengths in the range from 450 nm to 600 nm.

In the embodiment of FIG. 1, each color channel ChR, ChB, ChG comprises exactly two photodiodes, and, more specifically, one photodiode in the first row R1 and one photodiode in the second row R2. For example, channel ChR comprises exactly one photodiode PDR1 in row R1 and exactly one photodiode PDR2 in the row R2. For example, channel ChB comprises exactly one photodiode PDB1 in row R1 and exactly one photodiode PDB2 in the row R2. For example, channel ChG comprises exactly one photodiode PDG1 in row R1 and exactly one photodiode PDG2 in the row R2.

The photodiodes PDR1, PDB1, PDG1 of row R1 and PDR2, PDB2, PDG2 of row R2 are disposed in a common centroid arrangement. For example, the photodiodes PDB1 and PDB2 are disposed in the middle of the respective rows R1 and R2. For example, the photodiodes PDG1 and PDR2 are disposed on a first side of the photodiodes PDB1 and PDB2, in the respective rows R1 and R2, and the photodiodes PDR1 and PDG2 are disposed on a second side of the photodiodes PDB1 and PDB2, in the respective rows R1 and R2. Other common centroid arrangements could be envisaged by those skilled in the art.

According to one embodiment, as the absorption of the silicon is lower for the blue light than for the red and green light, the photodiodes PDB1 and PDB2 have bigger surface (in the top view of FIG. 1) than the other photodiodes PDR1, PDR2, PDG1, PDG2, in order to compensate this lower absorption. However, in alternative embodiments, all the photodiodes have the same surface.

Each of the three color channels ChR, ChB, and ChG comprises one readout circuit, preferably exactly one readout circuit. For example, channel ChR comprises a readout circuit RR, channel ChB comprises a readout circuit RB, and channel ChG comprises a readout circuit RG.

The readout circuit RR, respectively RG, of the channel ChR, respectively ChR, is connected to only the photodiode PDR1 in the row R1 and to only the photodiode PDR2 in the row R2, respectively to only the photodiode PDG1 in the row R1 and to only the photodiode PDG2 in the row R2. Further, in this embodiment where the channel ChB comprises exactly two photodiodes PDB1 and PDB2, the readout circuit RB of the channel ChB is connected to only the photodiode PDB1 in the row R1 and to only the photodiode PDB2 in the row R2.

Preferably, none of the readout circuits RR, RB, and RG of the sensor 1 is disposed between the two rows R1 and R2. For example, according to one embodiment, as shown on FIG. 1, all the readout circuits RR, RB, and RG of the sensor 1 are disposed along only one row R1 or R2, the readout circuits being disposed along the row R2 in the example shown by FIG. 1. Preferably, each of the readout circuits RR, RB and RG is aligned, in a direction perpendicular to the rows R1 and R2, with a photodiode of the row R2 (in this example where the readout circuits are disposed along the row R2) to which this readout circuit is connected, so that the length of the wire or connection connecting the readout circuit to the photodiode is shortened. For example, in FIG. 1, the readout circuit RR is vertically aligned with the photodiode PDR2 of the row R2, the readout circuit RB is vertically aligned with the photodiode PDB2 of the row R2 and the readout circuit RG is vertically aligned with the photodiode PDG2 of the row R2. Preferably, all the readout circuits RR, RB, and RG of the sensor 1 are aligned with each other in a direction parallel to the rows R1 and R2.

Preferably, in each color channel comprising exactly two photodiodes, one in each row R1, R2, the connection of the readout circuit of the channel to the photodiodes of the channel is of the daisy chain type. In other words, in each color channel comprising exactly two photodiodes, only one wire connects the photodiodes of the channel to the readout circuit of the channel, the photodiodes being connected to this wire the one after the others. In other words, in each color channel comprising exactly two photodiodes, a first photodiode of the color channel being in the row R1 or R1 which is the furthest away from the readout circuit of the color channel is connected to a second photodiode of the color channel being in the row R1 or R2 which is the closest from this readout circuit, the second photodiode being itself connected to the readout circuit. Thus, in each color channel, the signal from the first photodiode passes through the second photodiode.

The connection of the first photodiode to the second photodiode is, for example, implemented by a metal conduction layer and/or by using the doped region of the second photodiode. This kind of connection in the sensor 1 avoids extra connection(s) compared with a sensor where, for each color channel, each photodiode of color channel would be connected by a dedicated wire to the readout circuit of the color channel, this dedicated wire being connected to no other photodiode of the channel. Avoiding extra connection(s) allows for reducing the capacitance value of the connections of the photodiodes to the corresponding readout circuits.

According to one embodiment, although not shown on FIG. 1, each readout circuit RR, RB, RG of the sensor 1 comprises an integrator circuit configured to integrate the charge photo-generated in the photodiodes of the corresponding color channel, and an analog-to-digital converter coupled to the output of the integrator circuits in order to converter the analog signals provided by the integrator circuit into digital data.

According to one embodiment, although not shown on FIG. 1, each readout circuit RR, RB, RG of the sensor 1 is configured to implement a correlated double sampling (CDS). The implementation of a CDS in a readout circuit is in the abilities of those skilled in the art.

In the sensor 1, the fact that, for at least each of the color channels ChR and ChG, the readout circuit is connected to exactly one photodiode of the row R1 and exactly one photodiode of the row R2, the capacitance of the connection is decreased compared to:
- a common centroid ambient light sensor having a matrix of photodiodes with at least three rows and three columns where each readout circuit would be connected to at least two photodiodes of the matrix;
- a common centroid ambient light sensor having only one row of photodiodes where each readout circuit would be connected to at least two photodiodes of the row;
- a common centroid ambient light sensor having a exactly two row of photodiodes where each readout circuit would be connected to at least two photodiodes in each row; or
- a common centroid ambient light sensor having photodiodes arranged together to form a ring of photodiodes and where each readout circuit would be connected to at least two photodiodes of the ring.

Furthermore, as the photodiodes of the sensor 1 are arranged in exactly two rows R1 and R2 and, for at least each of the color channels ChR and ChG, the readout circuit is connected to exactly one photodiode of the row R1 and exactly one photodiode of the row R2, the sensor 1 is less cumbersome and has a lower value of capacitance of the connection than a common centroid ambient light sensor having the same number of photodiodes arranged in only one row or arranged together to form a ring of photodiodes, or than a common centroid ambient light sensor having the same number of channel but where the photodiodes are arranged in a matrix of at least three rows and at least three columns.

In the embodiment described in relation with FIG. 1, each color channel of the sensor comprises exactly one photodiode in the row R1 and exactly one photodiode in the row R2. In alternative embodiments, as it will be described below in relation with FIG. 2 and with FIG. 3, a plurality of the color channels of the sensor, but not all the color channels of the sensor, could each comprise more than exactly one photodiode per row. Preferably, in these alternative embodiments, all the color channels except one comprises exactly one photodiode in the row R1 and exactly one photodiode in the row R2. For example, the only color channel that comprises more than exactly one photodiode per row R1, R2 is the blue color channel, in order to compensate for the lower absorption of the blue light in the silicon.

Figure 2:
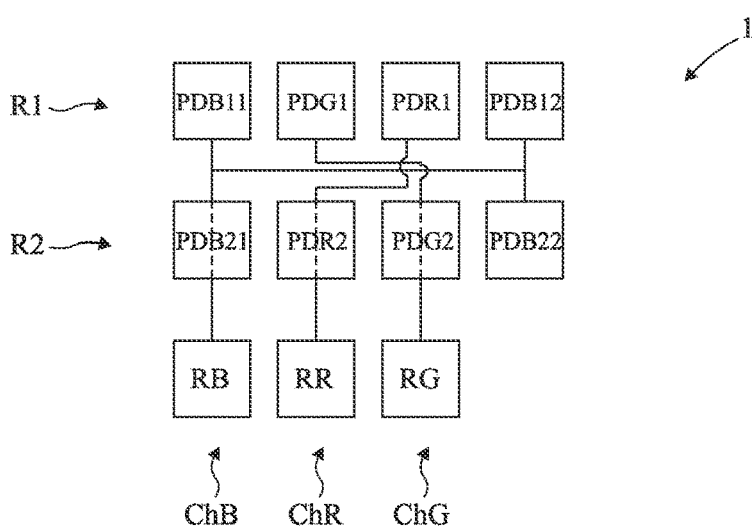
FIG. 2 illustrates, with a schematic top view, an alternative embodiment of the sensor of FIG. 1.

FIG. 2 illustrates, with a schematic top view, an alternative embodiment of the sensor of FIG. 1. Sensor 1 of FIG. 2 is similar to sensor 1 of FIG. 1, and only differences between these two sensors will be discussed.

In this alternative embodiment, at least one color channel of the sensor 1, but not all the color channels of the sensor 1, comprises more than exactly one photodiode per row R1, R2. More particularly, in the example of FIG. 2, all the color channels except one, in this example the blue color channel ChB, comprises exactly one photodiode in the row R1 and exactly one photodiode in the row R2, and the blue color channel ChB comprises, in the example of FIG. 2, exactly two photodiodes PDB11 and PDB12 in the row R1 and exactly two photodiodes PDB21 and PDB22 in the row R2.

Thus, further to the fact that the readout circuit RR, respectively RG, of the channel ChR, respectively ChG, is connected to exactly one photodiode PDR1, respectively PDG1, in the row 1 and to exactly one photodiode PDR2, respectively PDG2, in the row R2, the readout circuit RB of the color channel ChB is connected to exactly two photodiodes PDB11 and PDB12 in the row R1, and to exactly two photodiodes PDB21 and PDB22 in the row R2.

Preferably, the photodiodes PDB11 and PDB12 are arranged at the respective extremities of the row R1, the photodiodes PDB21 and PDB22 being arranged at the respective extremities of the row R2.

In the example of FIG. 2, all the readout circuits RR, RB and RG are disposed along the second row R2, and each readout circuit RR, RG, RB is aligned, in a direction perpendicular to the rows R1 and R2, with a photodiode of the row R2 to which the readout circuit is connected. More specifically, in the example of FIG. 2, the readout circuit RB of color channel ChB is vertically aligned with the photodiode PDB21, although, in an alternative example not shown, the circuit RB is vertically aligned with the photodiode PDB22.

As already indicated in relation with FIG. 1, in FIG. 2, the photodiodes of the sensor 1 are disposed in a common centroid arrangement. For example, photodiodes PDB11, PDG1, PDR1, and PDB12 of the row R1 are vertically aligned with the respective photodiodes PDB21, PDR2, PDG2, and PDB22 of the row R2. Other common centroid arrangements could be envisaged by those skilled in the art.

The sensor 1 of FIG. 2 have the similar advantages than those of the sensor 1 of FIG. 1.

Figure 3:
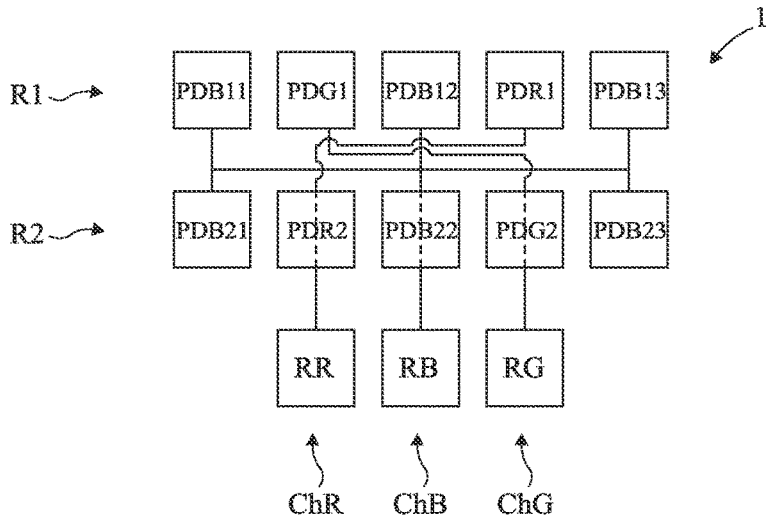
FIG. 3 illustrates, with a schematic top view, another alternative embodiment of the sensor of FIG. 1.

FIG. 3 illustrates, with a schematic top view, an alternative embodiment of the sensor of FIG. 1. Sensor 1 of FIG. 3 is similar to sensor 1 of FIG. 1, and only the differences between these two sensors will be encompassed.

In this alternative embodiment, at least one color channel of the sensor 1, but not all the color channels of the sensor 1, comprises more than exactly one photodiode per row R1, R2.

More particularly, in the example of FIG. 3, all the color channels except one, in this example the blue color channel ChB, comprises exactly one photodiode in the row R1 and exactly one photodiode in the row R2, and the other color channel, the channel ChB in the example of FIG. 3, comprises exactly three photodiodes PDB11, PDB12 and PDB13 in the row R1 and exactly three photodiodes PDB21, PDB22 and PDB23 in the row R2.

Thus, further to the fact that the readout circuit RR, respectively RG, of the channel ChR, respectively ChG, is connected to exactly one photodiode PDR1, respectively PDG1, in the row 1 and to exactly one photodiode PDR2, respectively PDG2, in the row R2, the readout circuit RB of the color channel ChB is connected to exactly three photodiodes PDB11, PDB12 and PDB13 in the row R1, and to exactly three photodiodes PDB21, PDB22 and PDB23 in the row R2.

Preferably, two of the three photodiodes PDB11, PDB12 and PDB13 are arranged at the respective extremities of the row R1 and the other of the three photodiodes PDB11, PDB12 and PDB13 is arranged at the middle of the row R1, two of the three photodiodes PDB21, PDB22 and PDB23 are arranged at the respective extremities of the row R2 and the other of the three photodiodes PDB21, PDB22 and PDB23 is arranged at the middle of the row R2.

In the example of FIG. 3, all the readout circuits RR, RB and RG are disposed along the second row R2, and each readout circuit RR, RG, RB is aligned, in a direction perpendicular to the rows R1 and R2, with a photodiode of the row R2 to which the readout circuit is connected. More specifically, in the example of FIG. 3, the readout circuit RB of color channel ChB is vertically aligned with the photodiode PDB22, although, in alternative examples not shown, the circuit RB is vertically aligned with the photodiode PDB12 or PDB23.

As already indicated in relation with FIG. 1, in FIG. 3, the photodiodes of the sensor 1 are disposed in a common centroid arrangement. For example, photodiodes PDB11, PDG1, PDB12, PDR1, and PDB13 of the row R1 are vertically aligned with the respective photodiodes PDB21, PDR2, PDB22, PDG2, and PDB23 of the row R2. Other common centroid arrangements could be envisaged by those skilled in the art.

The sensor 1 of FIG. 3 have similar advantages than those of the sensors 1 of FIGS. 1 and 2.

In the embodiments described in relation with FIGS. 1, 2 and 3, the readout circuits of the sensor are all disposed along the same row R1 or R2, and, more particularly along the row R2 in the examples of FIGS. 1 to 3. This allows the sensor 1 to be less cumbersome than a sensor 1 in which the readout circuits of the sensor 1 are split into two groups of readout circuits, the readout circuits of a first of the two groups are all disposed along the row R1 and the readout circuits of a second of the two groups are all disposed along the other row R2. However, this last configuration may be advantageous when the pitch of the readout circuits is higher than the pitch of the photodiodes. An example of such an alternative embodiment will be now described in relation with FIG. 4.

Figure 4:
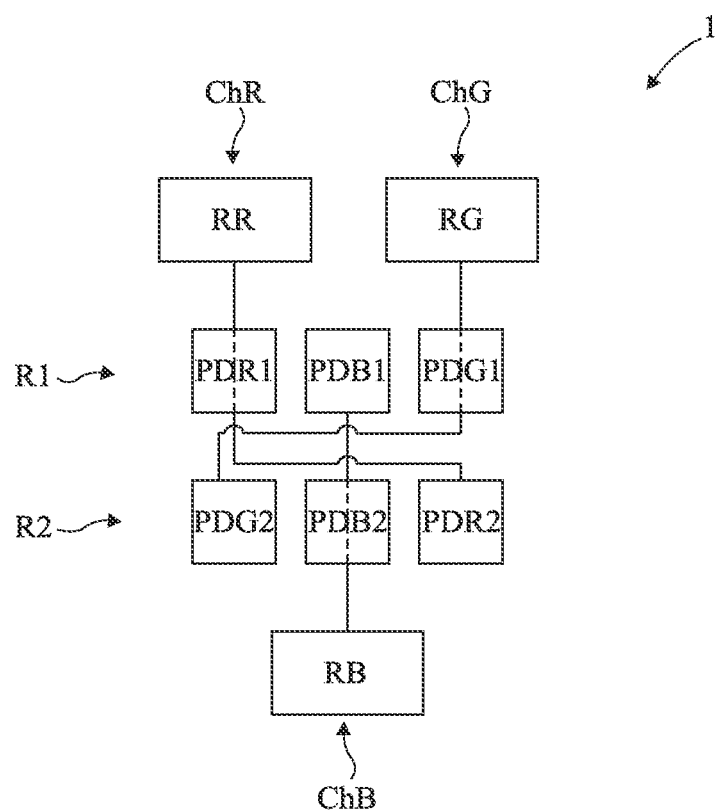
FIG. 4 illustrates, with a schematic top view, yet, another alternative embodiment of the sensor of FIG. 1.

FIG. 4 illustrates, with a schematic top view, yet another alternative embodiment of the sensor 1 of FIG. 1. Sensor 1 of FIG. 4 is similar to sensor 1 of FIG. 1, and only the differences between these two sensors will be encompassed.

In this alternative embodiment, the readout circuits RR, RB, and RG of the sensor 1 are not all arranged along the same row R1 or R2, and are instead arranged along the two row R1 and R2. In other words, the readout circuits RR, RB, and RG of the sensor 1 are split or divided into two groups of readout circuits, the readout circuits of the first group being arranged along the row R1, and the readout circuits of the second group are arranged along the row R2.

As already indicated in relation with the sensor 1 of FIG. 1, none of the readout circuits of the sensor 1 of FIG. 4 is disposed between the two rows R1 and R2.

Further, preferably, each readout circuit of the first group is aligned, in a direction perpendicular to the rows R1 and R2, with a photodiode of the row R1 to which the readout circuit is connected, and, similarly, each readout circuit of the second group is aligned, in a direction perpendicular to the rows R1 and R2, with a photodiode of the row R2 to which the readout circuit is connected.

Preferably, in each of the two groups, the readout circuits of the group are aligned with each other in a direction parallel to the rows R1, R2.

More particularly, in the example of FIG. 4, the readout circuits RR and RG belong to the first group of readout circuits and the readout circuit RB belongs to the second group of readout circuits. Thus, circuits RR and RG are disposed along the row R1 and circuit RB is disposed along row R2. In the example of FIG. 4, circuit RR is vertically aligned with the photodiode PDR1 of row R1, circuit RB is vertically aligned with the photodiode PDB2 of row R2 and circuit RG is vertically aligned with photodiode PDG1 of row R1.

The sensor 1 of FIG. 4 have similar advantages than those of the sensors 1 of FIGS. 1, 2 and 3.

Those skilled in the art will be capable of apply the alternative embodiment of FIG. 4 (two groups of readout circuits) to the alternative embodiments of FIG. 2 (exactly two photodiodes per row for at least one color channel) and FIG. 3 (exactly three photodiodes per row for at least one color channel).

Figure 5:
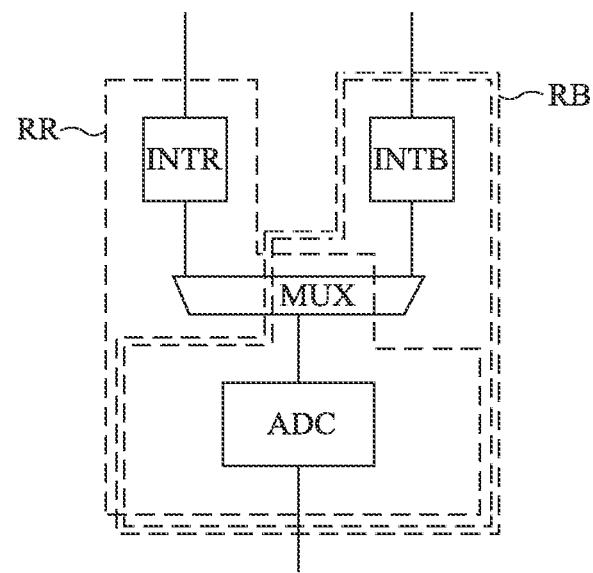
FIG. 5 is a schematic blocks view of an embodiment of a part of the sensor of FIG. 1.

As previously indicated in relation with the FIG. 1, at least two readout circuits of the sensor may share a common part or circuit, for example an analog-to-digital converter, as it will described in more detail for a specific example in relation with FIG. 5.

FIG. 5 is a schematic blocks view of an embodiment of at least two readout circuits of the sensor 1 previously described when these readout circuits share a common part or circuit.

Preferably, when two or more readout circuits share a common part, these readout circuits are arranged along the same row R1 or R2, and are preferably adjacent to each other, for example adjacent two by two.

More particularly, in the example of FIG. 5, the circuits RR and RB share a common circuit, in this example an analog-to-digital converter ADC.

For example, the circuit RR (delimited by a single dot line in FIG. 5) comprises an integrator circuit INTR, and the circuit RB (delimited by a double dot line in FIG. 5) comprises an integrator circuit INTB. In other words, the circuit INTR of circuit RR is dedicated to circuit RR and circuit INTB of circuit RB is dedicated to RB. For example, an input of circuit INTR corresponds to an input of circuit RR that is connected to the photodiodes of the channel ChR, and an input of circuit INTB corresponds to an input of circuit RB that is connected to the photodiodes of the channel ChB.

The circuit RR further comprises the circuit ADC that is shared with the circuit RB. In other words, both circuits RR and RB comprise the same and unique circuit ADC. For example, the circuits RR and RB both comprise a routing circuit MUX shared between the two circuits RR and RB. The circuit MUX selectively couples the output of circuit INTR to the input of circuit ADC or the output of circuit INTB to the input of circuit ADC.

Sharing the same circuit between at least two readout circuits, for example, the circuit ADC between the circuits RR and RB in FIG. 5, allows further reduction of the cumbersome sensor 1.

Those skilled in the art are capable of providing more than two readout circuits with a common circuit shared between these readout circuits, and/or to implement readout circuits where the common circuit shared between at least two readout circuits is not analog-to-digital converter.

In the embodiments previously described in relation with the FIGS. 1 to 4, the number N of color channels of the sensor 1 is equal to three. However, those skilled in the art are capable of providing sensors 1 with more than three color channels, as it will be described in an example with respect to FIG. 6.

Figure 6:
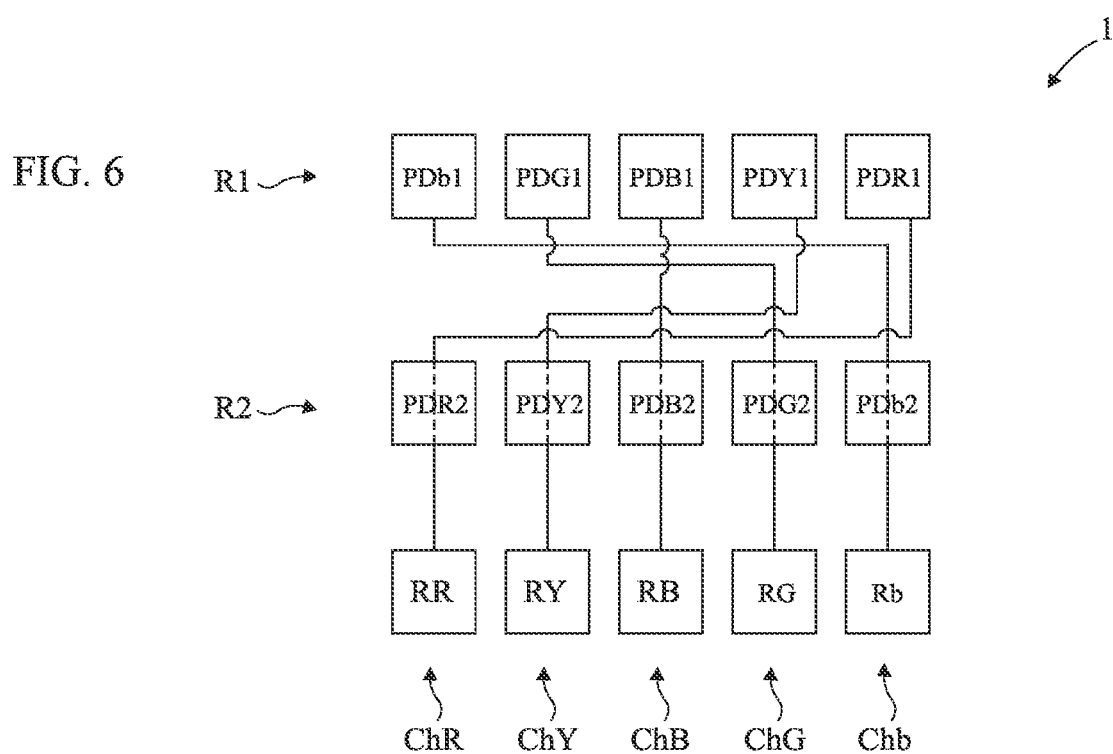
FIG. 6 illustrates, with a schematic top view, another embodiment of the sensor of FIG. 1.

FIG. 6 illustrates, with a schematic top view, another embodiment of the sensor 1 of FIG. 1 in the case where N is superior to three, for example equal to five in FIG. 6. The sensor 1 of FIG. 6 is similar to the one of FIG. 1, and only the differences between these sensors will be encompassed.

The sensor 1 of FIG. 6 comprises N=5 color channels ChR, ChB, ChG, Chb and ChY.

For example, the channel ChR is configured to measure the quantity of red light received by the sensor 1, the red light having for example wavelengths in the range from 600 nm to 680 nm. For example, the channel ChB is configured to measure the quantity of blue light received by the sensor 1, the blue light having for example wavelengths in the range from 380 nm to 450 nm. For example, the channel ChG is configured to measure the quantity of green light received by the sensor 1, the green light having for example wavelengths in the range from 500 nm to 580 nm. For example, the channel Chb is configured to measure the quantity of blue (or cyan) light having wavelengths longer than those of the blue light measured by the channel ChB, the cyan light received by the color channel Chb having for example wavelengths in the range from 460 nm to 550 nm. For example, the channel ChY is configured to measure the quantity of yellow light received by the sensor 1, the yellow light having for example wavelengths in the range from 550 nm to 610 nm.

In the embodiment of FIG. 6, each color channel ChR, ChB, ChG, Chb, ChY comprises exactly two photodiodes, and, more specifically, one photodiode in the first row R1 and one photodiode in the second row R2.

For example, channel ChR comprises exactly one photodiode PDR1 in row R1 and exactly one photodiode PDR2 in the row R2. For example, channel ChB comprises exactly one photodiode PDB1 in row R1 and exactly one photodiode PDB2 in the row R2. For example, channel ChG comprises exactly one photodiode PDG1 in row R1 and exactly one photodiode PDG2 in the row R2. For example, channel Chb comprises exactly one photodiode PDb1 in row R1 and exactly one photodiode PDb2 in the row R2. For example, channel ChY comprises exactly one photodiode PDY1 in row R1 and exactly one photodiode PDY2 in the row R2.

The photodiodes PDR1, PDB1, PDG1, PDb1, PDY1 of row R1 and PDR2, PDB2, PDG2, PDb2, PDY2 of row R2 are disposed in a common centroid arrangement. For example, the photodiodes PDB1 and PDB2 are disposed in the middle of the respective rows R1 and R2, and photodiodes PDb1, PDG1, PDB1, PDY1 and PDR1 of the row R1 are vertically aligned with the respective photodiodes PDBR2, PDY2, PDB2, PDG2 and PDb2 of the row R2. Other common centroid arrangements could be envisaged by those skilled in the art.

The readout circuit RR, respectively RG, of the channel ChR, respectively ChR, is connected to only the photodiode PDR1 in the row R1 and to only the photodiode PDR2 in the row R2, respectively to only the photodiode PDG1 in the row R1 and to only the photodiode PDG2 in the row R2. Similarly, the readout circuit RY, respectively Rb, of the channel ChY, respectively Chb, is connected to only the photodiode PDY1 in the row R1 and to only the photodiode PDY2 in the row R2, respectively to only the photodiode PDb1 in the row R1 and to only the photodiode PDb2 in the row R2. Further, in this embodiment where the channel ChB comprises exactly two photodiodes PDB1 and PDB2, the readout circuit RB of the channel ChB is connected to only the photodiode PDB1 in the row R1 and to only the photodiode PDB2 in the row R2.

Each of the color channels ChR, ChB, Chb, ChY, and ChG comprises one readout circuit, preferably exactly one readout circuit. For example, channel ChR comprises a readout circuit RR, channel ChB comprises a readout circuit RB, channel Chb comprises a readout circuit Rb, channel ChY comprises a readout circuit RY, and channel ChG comprises a readout circuit RG.

Preferably, none of the readout circuits RR, RB, Rb, RY, and RG of the sensor 1 is disposed between the two rows R1 and R2.

For example, according to one embodiment, as shown on FIG. 1, all the readout circuits RR, RB, Rb, RY, and RG of the sensor 1 are disposed along only one row R1 or R2, the readout circuits being disposed along the row R2 in the example shown by FIG. 6. Preferably, each of the readout circuits RR, RB, Rb, RY and RG is aligned, in a direction perpendicular to the rows R1 and R2, with a photodiode of the row R2 (in this example where the readout circuits are disposed along the row R2) to which this readout circuit is connected. For example, in FIG. 6, the readout circuits RR, RY, RB, RG, and Rb are vertically aligned with the respective photodiodes PDR2, PDY2, PDB2, PDG2, and PDb2 of the row R2. Preferably, all the readout circuits RR, RB, RY, Rb, and RG of the sensor 1 are aligned with each other in a direction parallel to the rows R1 and R2.

Preferably, in each color channel comprising exactly two photodiodes, one in each row R1, R2, the connection of the readout circuit of the channel to the photodiodes of the channel is of the daisy chain type.

Although, in the example of FIG. 6, the number N of color channels of the sensor 1 is equal to 5, those skilled in the art are capable of adapting the embodiment of FIG. 6 to examples where N is equal to four or where N is superior to five.

Although, in the example of FIG. 6, each color channel comprises exactly one photodiode in the row R1 and exactly one photodiode in the row R2, those skilled in the art are capable of adapting the embodiment of FIG. 6 to examples where at least one color channel but not all the color channels, for example exactly one color channel such as the blue channel ChB, comprises more than exactly one photodiode per row R1, R2, as it was described in relation with FIGS. 2 and 3.

Although, in the example of FIG. 6, all the readout circuits are disposed along the same row R2, those skilled in the art are capable of adapting the embodiment of FIG. 6 to the alternative embodiment described in relation with FIG. 4 where the readout circuits are split into a first groups of readout circuits disposed along the row R1 and a second groups of readout circuits disposed along the row R2.

Various embodiments and variants have been described. Those skilled in the art will understand that certain features of these embodiments can be combined and other variants will readily occur to those skilled in the art. For example, although it has been shown in relation with FIG. 5 that two readout circuits may share a common circuit such as an analog-to-digital converter, those skilled in the art are capable to provide a sensor 1 where more than two readout circuits share a common circuit, which could be or not an analog-to-digital converter.

Finally, the practical implementation of the embodiments and variants described herein is within the capabilities of those skilled in the art based on the functional description provided hereinabove. In particular, the implementation of the readout circuits of the sensors 1 described is not limited to the schematic example described in relation with FIG. 5, and, more generally, is not limited to readout circuits each comprising an integrator circuit and/or an analog-to-digital converter.

What is claimed is:

1. A common centroid ambient light sensor comprising:
a matrix of photodiodes having exactly a first row and a second row;
at least three color channels including a first color channel, a second color channel, and a third color channel;
a first readout circuit of the first color channel connected to exactly one photodiode in the first row and exactly one photodiode in the second row;
a second readout circuit of the second color channel connected to exactly one photodiode in the first row and exactly one photodiode in the second row; and
a third readout circuit of the third color channel connected to the exactly one photodiode in the first row and the exactly one photodiode in the second row, wherein each of the first, second, and third color channels comprises exactly one photodiode from the matrix of photodiodes in the first row and exactly one photodiode from the matrix of photodiodes in the second row.

2. The common centroid ambient light sensor of claim 1, wherein the first color channel comprises exactly one of the first readout circuit, the second color channel comprises exactly one of the second readout circuit, and the third color channel comprises exactly one of the third readout circuit.

3. The common centroid ambient light sensor of claim 2, wherein at least two of the first, the second, and the third readout circuits share a common circuit.

4. The common centroid ambient light sensor of claim 3, wherein the common circuit comprises an analog-to-digital converter.

5. The common centroid ambient light sensor of claim 2, wherein each of the first, the second, and the third readout circuits comprises an integrator circuit.

6. The common centroid ambient light sensor of claim 2, wherein each of the first, the second, and the third readout circuits is configured to implement a correlated double sampling.

7. The common centroid ambient light sensor of claim 1, wherein the third readout circuit of the third color channel is arranged in a middle of the first row and in a middle of the second row.

8. The common centroid ambient light sensor of claim 1, wherein, in each of the first and second color channels, the respective first or the second readout circuit is connected to the exactly one photodiode in the first row and the exactly one photodiode in the second row with a daisy chain type connection.

9. The common centroid ambient light sensor of claim 1, further comprising a guard ring surrounding a set of the first and second rows.

10. The common centroid ambient light sensor of claim 1, wherein the at least three color channels further include a fourth color channel and a fifth color channel.

11. A common centroid ambient light sensor comprising:
a matrix of photodiodes having exactly a first row and a second row;
at least three color channels including a first color channel, a second color channel, and a third color channel;
a readout circuit of the first color channel connected to exactly one photodiode in the first row and exactly one photodiode in the second row; and
a readout circuit of the second color channel connected to exactly one photodiode in the first row and exactly one photodiode in the second row, wherein no readout circuit is disposed between the first and second rows, the matrix of photodiodes, the at least three color channels, the readout circuit of the first color channel and the readout circuit of the second color channel being arranged in a common centroid layout, wherein the read-out circuits being arranged in the common centroid layout comprises the first color channel being connected to a first end of the first row of the photodiode and a second end of the second row of the photodiode, and the second color channel being connected to a second end of the first row and a first end of the second row, the first ends of the first and the second rows being on a first side of the common centroid layout and the second ends of the first and the second rows being on a second side of the common centroid layout.

12. The common centroid ambient light sensor of claim 11, wherein all the readout circuits are disposed along the second row and each of the readout circuits is aligned, in a direction perpendicular to the first and second rows, with a photodiode of the second row to which the readout circuit is connected.

13. The common centroid ambient light sensor of claim 12 wherein all the readout circuits are aligned with each other in a direction parallel to the first and second rows.

14. The common centroid ambient light sensor of claim 11, wherein:
the readout circuits are divided into two groups of readout circuits;
the readout circuits of a first of the two groups are disposed along the second row;
each of the readout circuits of the first of the two groups is aligned, in a direction perpendicular to the first and second rows, with a photodiode of the second row to which the readout circuit is connected;
the readout circuits of a second of the two groups are disposed along the first row; and
each of the readout circuits of the second of the two groups is aligned, in a direction perpendicular to the first and second rows, with a photodiode of the first row to which the readout circuit is connected.

15. The common centroid ambient light sensor of claim 14, wherein the readout circuits of the first of the two groups are aligned with each other in a direction parallel to the first and second rows, and wherein the readout circuits of the second of the two groups are aligned with each other in a direction parallel to the first and second rows.

16. The common centroid ambient light sensor of claim 11, further comprising:
a readout circuit of the third color channel connected to the exactly one photodiode in the first row and the exactly one photodiode in the second row, wherein each of the first, second, and third color channels comprises exactly one photodiode from the matrix of photodiodes in the first row and exactly one photodiode from the matrix of photodiodes in the second row.

17. A common centroid ambient light sensor comprising:
a matrix of photodiodes having exactly a first row and a second row, each of the first row and the second row comprising color photodiodes from the matrix that are sensitive to at least three colors, a position of the color photodiodes sensitive to the same color being reversed between the first row to the second row;
at least three color channels including a first color channel, a second color channel, and a third color channel;
a first readout circuit of the first color channel connected to exactly one photodiode in the first row and exactly one photodiode in the second row;
a second readout circuit of the second color channel connected to exactly one photodiode in the first row and exactly one photodiode in the second row; and
a third readout circuit of the third color channel connected to the exactly one photodiode in the first row and the exactly one photodiode in the second row, wherein each of the first, second, and third color channels comprise exactly one photodiode from the matrix of photodiodes in the first row and exactly one photodiode from the matrix of photodiodes in the second row.

18. The common centroid ambient light sensor of claim 17, wherein the first color channel comprises exactly one of the first readout circuits.

19. The common centroid ambient light sensor of claim 18, wherein at least two readout circuits share a common circuit.

20. The common centroid ambient light sensor of claim 19, wherein the common circuit comprises an analog-to-digital converter.

* * * * *